(No Model.)
G. F. BROTT.
COTTON GIN.
No. 379,760. Patented Mar. 20, 1888.
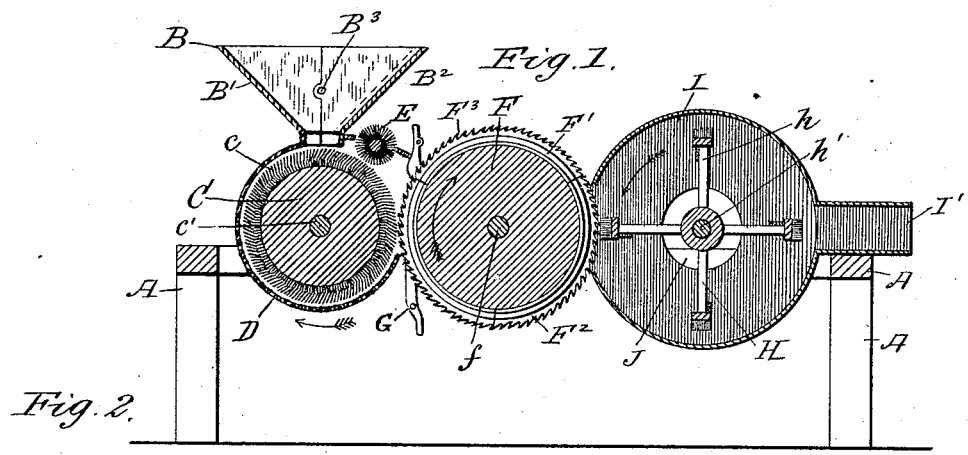
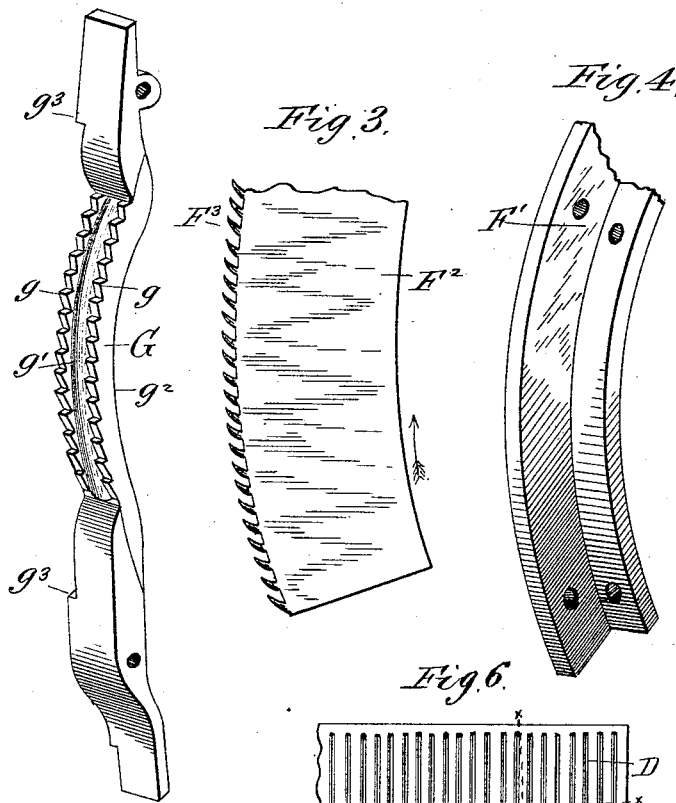
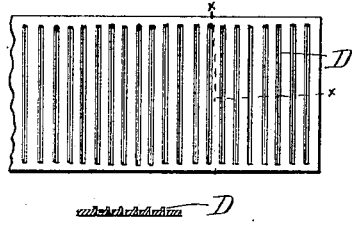
Witnesses:
T. R. Stuart
L. Seward Bacon
Inventor:
George F. Brott,
By Marble & Mason,
Attys.

UNITED STATES PATENT OFFICE.

GEORGE F. BROTT, OF BLADENSBURG, MARYLAND.

COTTON-GIN.

SPECIFICATION forming part of Letters Patent No. 379,760, dated March 20, 1888.

Application filed October 7, 1887. Serial No. 251,675. (No model.)

*To all whom it may concern:*

Be it known that I, GEORGE F. BROTT, a citizen of the United States, residing at Bladensburg, in Prince George's county and State of Maryland, have invented certain new and useful Improvements in Cotton-Gins; and I do hereby declare the following to be a full, clear, and exact description of the invention, such as will enable others skilled in the art to which it appertains to make and use the same.

My invention relates to improvements in cotton-gins; and it consists of the peculiar construction and arrangement or combination of parts, which will be fully hereinafter disclosed in the description and claims.

The object of my invention has been to produce a machine that is peculiarly adapted for ginning seed-cotton and separating therefrom while undergoing the ginning process all hulls, twigs, dirt, and other foreign matter that may be present therein—a machine in which the cotton fiber is removed from the seed by a gradual combing or drawing action similar to that of carding; one which will not cut or otherwise injure the fiber, but will thoroughly separate the same from the seed; one which will gin long or short staple and dry or damp cotton with equal facility, and one which is cheaply manufactured and easily handled or operated. I attain this object by the mechanism herein described, and illustrated in the accompanying drawings, in which the same letters of reference indicate the same parts, and in which—

Figure 1 represents a longitudinal vertical section of a cotton-gin constructed in accordance with my invention; Fig. 2, a detail perspective view of one of the ribs; Fig. 3, an enlarged detail view of a portion of one of the sections of a toothed ginning-ring; Fig. 4, a detail view of part of one of the angle-irons to which the sectional ginning-rings are attached; Fig. 5, a vertical section of an angle-iron with a section of a toothed ginning-ring riveted thereto; and Fig. 6, a broken plan view, and also a sectional view on the dotted line $xx$, of the transversely slotted and ribbed plate which partially surrounds the feeding and carding cylinder.

A represents the frame-work of the machine, which may be of any desired form or size; but I have found in practice that a machine somewhat over three feet in length and three feet in width produces practical and good results.

B represents the hopper, which is supported on the frame-work directly over the feeding and carding cylinder C, and is made in two sections, one of which, B', is stationary and the other, B², is made to fit closely and move within section B', and is also pivotally secured thereto at or near its center by clamp-screws B³. With this construction of hopper the size of the discharge-opening at the bottom thereof may be regulated by loosening the clamp-screws and pressing the upper end of the section B² outward, when the lower end thereof will move inward toward the lower end of section B', and thereby decrease the size of the opening; also, when the upper end of section B² is pressed inward, or toward section B', the lower end thereof will move outward, increase the size of the opening, and thus regulate the supply of cotton to the feeding and carding cylinder. This feeding and carding cylinder C, or, as I sometimes term it, the "feeding-brush," is a wooden roll clothed with fine yielding or flexible steel teeth or wires $c$, that are bent near their outer ends, so as to incline slightly forward, or in the direction of the rotation of the cylinder. They are arranged closely together, and thus prevent seed from entering and lodging between them; also, they are about one inch in length, which not only renders them flexible and prevents breaking of the fiber, but permits them to readily enter the latter and remove the same close up to the seed. This feeding and carding cylinder is horizontally arranged upon the shaft $c'$, which has suitable bearings on the frame-work of the machine.

D represents a transversely ribbed and slotted plate which extends over the front and lower portions of the feeding and carding cylinder.

E represents a stationary cylindrical brush or carding-surface, which is constructed of flexible straight steel wires or teeth, is secured above the rear portion of the feeding and carding cylinder C, as shown in Fig. 1, and is designed to aid said cylinder in distributing the cotton and in straightening or carding out the fibers. It is held stationary by any suitable means which will permit it to be rotated, as occasion requires, for presenting different portions thereof to the opposing action of the feeding and carding cylinder, or for cleaning purposes.

F represents the ginning-cylinder, which is formed of a wooden roll mounted on a shaft, $f$, which has bearings on the frame-work. Upon this cylinder angle-irons $F'$ are placed and secured by screws, said angle-irons being constructed, preferably, in three sections, each section being equal in length to one-third of the circumference of the cylinder. To the upwardly-projecting flanges of said sectional angle-irons are riveted sectional ginning-rings, $F^2$, which are made of steel of about one-sixteenth of an inch in thickness and about one and one-half inch in height. They are also made in three sections, and so as to conform to the vertically-projecting flanges of the angle-irons when resting upon the cylinder. The teeth $F^3$, which are formed integrally with said sectional ginning-rings, are round, sharp-pointed, or tapered from base to point and slightly curved forward, or in the direction of rotation of the cylinder, as more plainly shown in Fig. 3. The object in constructing the ginning-rings and angle-irons in sections and securing them to the cylinder by screws is that should any part of either become broken or otherwise injured or disarranged it can be readily removed by a screw-driver without disturbing any other part of the machine, and with little loss of time.

G represents one of the ribs, which are constructed with two rows of upwardly-projecting teeth, $g$ $g$, and a furrow or channel, $g'$, between them, as shown in Fig. 2; also, the backs of said ribs may be made wedge-shaped, or not as wide as their fronts, so as to prevent contact or friction of the teeth therewith. These ribs are arranged and secured vertically side by side, as usual, and just in front of the ginning-cylinder F, and between the same and the carding-cylinder C; also, they are securely fastened to the frame-work in such manner that the projections $g^3$ $g^3$ at the upper and lower ends of one rib rest against the side of the next rib, thus leaving openings through which the teeth $F^3$ on the sectional ginning-disk slightly protrude.

H is the brush-fan, which is composed of a number of brushes secured to the edges of flat wooden strips mounted on the ends of radial arms $h$, which are secured to the shaft $h'$. This shaft also has bearings on the frame-work of the machine.

I is a metal casing, which incloses the brush-fan H, and $I'$ an opening through which the cotton, after being ginned, is thrown into a lint-room by said brush-fan or delivered to a condenser.

J is an opening in the casing I for the admission of air.

The shafts $c'$ and $f$ of the cylinders C and F and shaft $h'$ of the brush-fan H are to be operated from any suitable motive power, being so belted or geared together that shafts $c'$ and $f$ will revolve in one and the same direction and the shaft $h'$ in the opposite direction, as indicated by the arrows, but so that they shall revolve at different speeds—as, for instance, the shafts $c'$ and $h'$ to make four hundred revolutions and the shaft $f$ one hundred revolutions per minute. The seed-cotton, being placed in the hopper B, comes in contact with the wire clothing on the feeding and carding cylinder C, and is carried thereby against and past the cylindrical stationary brush or carding-surface E, which not only aids in distributing the cotton and in straightening or carding out the fiber, but assists said cylinder in partially loosening and detaching the fiber from the seed. After passing the stationary brush or carding-surface the cotton is thrown against the teeth of the ginning-cylinder and the ribs G, which latter, by reason of their upwardly-projecting teeth $g$, hold the fiber and prevent it from falling down upon the transversely ribbed and slotted plate D. In the meantime any hulls, twigs, dirt, or other foreign matter that may be present in the cotton passes down through the furrows or channels between the teeth of the ribs and falls upon and passes out through said transversely ribbed and slotted plate. This hopper, feeding and carding cylinder, stationary carding-surface, and transversely ribbed and slotted plate are capable of being and are designed and intended to be employed in connection with my construction of cotton-gin for cleaning and straightening out the fiber and delivering the same to the devices for removing it from the seed. The round tapering curved teeth of the ginning-cylinder F, which project through the openings between the ribs, remove the fiber which has lodged upon the teeth of the ribs and draw it upwardly through said openings, and at the same time permit the seed which has remained attached to the cotton and been lodged against the ribs to drop down through the channels or furrows $g'$ and fall onto the transversely ribbed and slotted plate D. The ribs on this plate act to intermittingly retard the passage of the seed beneath the feeding and carding cylinder until said cylinder has acted thereon sufficiently to remove any fiber which may have remained thereon. The cleaned seed and all dirt, &c., will then readily pass out through the slots in said plate, which, as shown, are located in the rear of the ribs. The fiber removed by the ginning-cylinder is carried around until it comes in contact with the brush-fan, which removes it from the ginning-cylinder and delivers it to a condenser or into a lint-room, as desired, through the opening $I'$.

Having thus fully described my invention, what I claim as new is—

1. In a cotton-gin, the combination of a hopper, a feeding and carding cylinder, a stationary carding-surface arranged above the rear portion of said cylinder, a transversely ribbed and slotted plate partially surrounding said cylinder, and devices for removing the fiber from the seed, substantially as described.

2. In a cotton-gin, the combination of the hopper, the feeding and carding cylinder clothed or provided with fine yielding forwardly-inclined teeth, the stationary carding-surface provided with straight teeth and arranged above the rear portion of said cylinder, the transversely ribbed and slotted plate, and devices for removing the fiber from the seed, substantially as described.

3. In a cotton-gin, the combination of the hopper, the transversely ribbed and slotted plate, the feeding and carding cylinder clothed with fine yielding forwardly-inclined teeth, the cylindrical stationary carding-surface provided with straight teeth, the ribs, and the ginning-cylinder, substantially as described.

4. In a cotton-gin, the combination of the hopper, the transversely ribbed and slotted plate, the feeding and carding cylinder, the stationary carding-surface, the ribs provided with upwardly-projecting teeth and with furrows or channels between said teeth, and the ginning-cylinder, substantially as described.

5. A cotton-gin comprising a hopper, a ribbed and slotted plate, a feeding and carding cylinder, a cylindrical stationary carding-surface, a ginning-cylinder, ribs, and a fan-brush and its casing, substantially as described.

6. A cotton-gin rib provided with two rows of upwardly-projecting teeth and with a furrow or channel between said teeth, substantially as described.

7. In a cotton-gin, the combination of ribs provided with rows of upwardly-projecting teeth and intermediate furrows or channels, with a ginning-cylinder provided with rings having round, sharp-pointed, and curved teeth, substantially as described.

In testimony whereof I affix my signature in presence of witnesses.

GEORGE F. BROTT.

Witnesses:
L. SEWARD BACON,
TOM R. STUART.